(12) United States Patent
Abbiati

(10) Patent No.: US 10,856,688 B2
(45) Date of Patent: Dec. 8, 2020

(54) APPARATUS FOR PRESSING A DOSE OF COFFEE WITHIN THE PORTAFILTER

(71) Applicant: Gruppo Cimbali S.p.A., Binasco (IT)

(72) Inventor: Giacomo Abbiati, Binasco (IT)

(73) Assignee: Gruppo Cimbali S.p.A.

( * ) Notice: Subject to any disclaimer, the term of this patent is extended or adjusted under 35 U.S.C. 154(b) by 133 days.

(21) Appl. No.: 15/829,029

(22) Filed: Dec. 1, 2017

(65) Prior Publication Data

US 2018/0153330 A1 Jun. 7, 2018

(30) Foreign Application Priority Data

Dec. 2, 2016 (IT) .................. 102016000122741

(51) Int. Cl.
| | | |
|---|---|---|
| *A47J 31/06* | (2006.01) | |
| *A47J 42/40* | (2006.01) | |
| *B30B 9/04* | (2006.01) | |
| *B30B 9/06* | (2006.01) | |
| *B30B 15/30* | (2006.01) | |

(52) U.S. Cl.
CPC ........... *A47J 31/0657* (2013.01); *A47J 42/40* (2013.01); *B30B 9/047* (2013.01); *B30B 9/06* (2013.01); *B30B 15/30* (2013.01)

(58) Field of Classification Search
CPC .... A47J 31/0657; A47J 31/0663; A47J 42/40; A47J 31/44; A47J 31/46; A47J 31/42; A47J 31/043; A47J 31/3633; A47J 31/3609; A47J 31/404; A47J 31/54; A47J 31/057; A47J 31/0573; A47J 31/52; A47J 42/38; A47J 42/26; A47J 42/44; A47J 42/12; A47J 42/54; A47J 42/36; A47J 42/50; A47J 42/46; A47J 42/42; B30B 1/24; B30B 9/3067; F25C 5/12
USPC .... 100/99; 99/280, 286, 287, 295, 300, 304, 99/306, 307
See application file for complete search history.

(56) References Cited

U.S. PATENT DOCUMENTS 9,737,167 B2 * 8/2017 Mazzer ................... A47J 31/08
10,105,002 B2 * 10/2018 Grassia ................ A47J 31/404
10,376,091 B2 * 8/2019 Psarologos ............. A47J 31/42
(Continued)

FOREIGN PATENT DOCUMENTS

| DE | 102014019778 A1 | 8/2016 |
|---|---|---|
| EP | 1126774 A1 | 8/2001 |

(Continued)

*Primary Examiner* — Shelley M Self
*Assistant Examiner* — Fred C Hammers
(74) *Attorney, Agent, or Firm* — Alan G. Towner; Leech Tishman Fuscaldo & Lampl

(57) ABSTRACT

An apparatus for filling the basket of a portafilter of an espresso machine with a predetermined dose of coffee grounds and for pressing it within the portafilter is disclosed. A support device for supporting the portafilter projects out of a front wall of the espresso machine. The portafilter is placed on the support device in a first coffee-dispensing position below a coffee grounds dispenser, then moved to a second position below a pressing device. In the second position, a pestle of the pressing device is moved vertically toward the dose of coffee contained in a basket of the portafilter to compress the coffee grounds a desired amount, and is then removed vertically away from the basket of the portafilter containing the pressed coffee dose.

11 Claims, 9 Drawing Sheets

(56) References Cited

U.S. PATENT DOCUMENTS

2006/0254428 A1 11/2006 Glucksman et al.
2015/0289712 A1* 10/2015 Choi .................... A47J 31/46
99/300

FOREIGN PATENT DOCUMENTS

| NL | 2007126 C | 1/2013 |
|----|-----------|--------|
| NL | 2007126 C2 * | 1/2013 |
| WO | 2012045112 A1 | 4/2012 |
| WO | 2014165905 A1 | 10/2014 |
| WO | 2014203073 A1 | 12/2014 |

* cited by examiner

APPARATUS FOR PRESSING A DOSE OF COFFEE WITHIN THE PORTAFILTER

FIELD OF THE INVENTION

The present invention relates to an apparatus for filling the basket of a portafilter of an espresso machine with a predetermined dose of coffee grounds and for pressing it within the portafilter.

BACKGROUND ART

As is known in espresso preparation, in addition to the particle size of the coffee grounds, the pressing degree of the coffee powder constituting the dose in the portafilter, and the uniformity with which pressing is distributed throughout the area defined by the basket of the portafilter, have a key role for obtaining a quality beverage.

Thus, if coffee grounds are not pressed with an adequate degree of compression and with an uniform distribution throughout the dose, there is the risk that, when pressurized hot water is introduced into the portafilter for forming the beverage, then it may find preferred passages and flow through the dose of coffee grounds with an inadequate flow rate for proper extraction of coffee flavors from the overall amount of coffee that forms the dose, thereby providing a beverage of unsatisfactory quality.

Therefore, when the dose of coffee grounds is introduced into the basket of the portafilter, it should be compressed to a given degree of compression.

In practice optimum flavor extraction effectiveness and hence optimum beverage quality may be achieved by applying a force of 15 to 25 Kgf on the surface of the dose of coffee grounds in the basket of a portafilter.

Assuming that the surface area to be pressed in a portafilter is about 24 cm$^2$, the compression pressure on the coffee grounds ranges on average from 0.6 Kgf/cm$^2$ to 1.05 Kgf/cm$^2$.

In the most typical prior art applications, pressure is manually applied to the dose of coffee powder by the operator of the coffee machine, the so-called "barista", using a pestle composed of a disk having a diameter substantially equal to that of the opening of the basket of the portafilter, and a handle thereon which is designed to be held to exert the compression force.

With this manual technology, the degree of compression applied to the dose of coffee grounds may change from time to time, and consistent optimum results can only rely on the skills of the operator.

The barista may simply inadvertently lay the pestle on the coffee grounds in a position in which it is not parallel to the bottom of the basket of the portafilter for compression to be distributed unevenly throughout the dose.

In an attempt to maximize consistent and uniform distribution of the degree of compression received by the dose of coffee grounds in the basket of the portafilter, and in order that the operator may avoid the continuous physical exercise associated with manual compression of the dose, which is particularly hard with peak customer flows, the prior art also suggests mechanical compression devices.

One example of a mechanical compression device which uses the elastic energy released by a spring on a pestle member, and loaded as the device is moved toward the dose of coffee grounds, is disclosed in WO 2014/203073 A1.

Further examples of mechanical devices for compressing the dose of coffee grounds in a portafilter are disclosed in DE 10 2014 019778 and NL 2007126.

In accordance with these prior art examples, the compression force exerted by a pestle on the dose of coffee grounds is generated by a hydraulic cylinder structure connected to the shaft of the pestle and by means of a rack-and-pinion mechanism respectively.

The prior art has also suggested examples of equipment which, in addition to compressing the dose of coffee grounds within the basket of the portafilter, also fill the dose of coffee grounds beforehand without having to move the portafilter from the apparatus that dispenses the dose with a given particle size and in a given amount, and place it in a different apparatus in which compression is carried out.

Exemplary embodiments of this technique are disclosed in WO 2012/045112 A1 and EP 1 126 774 A1.

In accordance with the technology as disclosed in the above-mentioned prior art documents, it shall be noted that the pestle for exerting compression on the dose of coffee grounds is in the form of a helical element located at the end of a rotary shaft.

This helical element is within the basket of the portafilter when the latter is placed on the apparatus with said shaft having the helical element perpendicular above the emplacement of the portafilter, even before being filled with the dose of coffee grounds.

Therefore, the flow of coffee grounds can only reach the basket of the portafilter once it has passed the helical elements of the pestle, with the latter later exerting its compression by being rotated by a motor connected to its support shaft.

Therefore, although this prior art uses a single apparatus to fill the basket of the portafilter with a dose of coffee grounds and also compressing said dose, while maintaining the position of the portafilter unchanged during both operations, the prior art is found in practice to cause the drawback that the amount of the dose of coffee grounds is changed at every dispensing event to the basket of the portafilter and compression thereon also changes from the proper nominal value that this dose has when it is dispensed by the grinder-doser and is sent to the basket of the portafilter.

This is because part of the coffee flow is lost on the surfaces of the helical element of the pestle and sticks therewith and does not contribute to form the amount designed to be compressed.

Since espresso preparation doses are just a few grams, even the loss of very small and also uncontrollable amounts causes dispensing of beverages having an unsatisfactory, inconsistent taste.

SUMMARY OF THE INVENTION

The object of the present invention is to obviate the drawbacks of the above-mentioned prior art by providing an apparatus that can fill the basket of a portafilter for espresso coffee machines with a predetermined dose of coffee grounds and also compresses the filled dose, in the same apparatus, without the risk of losing even the smallest amount of coffee powder that forms the dose, while maintaining a consistent quality of the beverage being dispensed.

This and other objects, as better explained hereafter, are fulfilled by an apparatus for filling the basket of a portafilter of an espresso machine with a predetermined dose of coffee grounds and for pressing it within the portafilter, which is characterized by claim 1 below.

BRIEF DESCRIPTION OF THE FIGURES

The invention will be now described in greater detail with reference to certain embodiments thereof, given by way of illustration and without limitation, and shown in the annexed drawings, in which.

DETAILED DESCRIPTION

Figure 1:
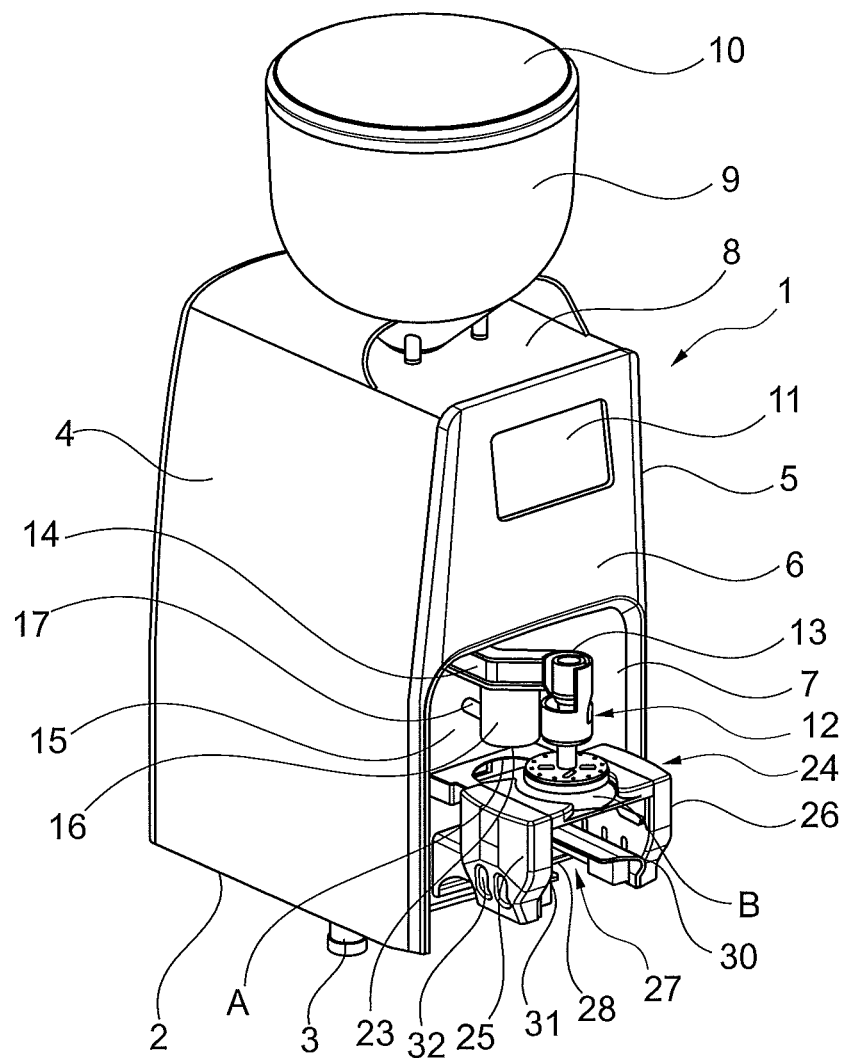
FIG. 1 shows an overall perspective view of the apparatus of the invention in a first embodiment thereof without the portafilter on the support.

Referring to the above figures and particularly to FIG. 1, the apparatus of the invention has been designated by numeral 1 as a whole.

It comprises a base 2, with conventional height-adjustable support feet 3. The outer structure of the apparatus comprises the sides 4 and 5 as well as the front panel 6, with an opening 7 formed therein for access to the operating parts of the apparatus as described in greater detail below.

The top is closed by a cover 8, which has a container 9 with its own lid, mounted thereupon, as is known in the art.

Such container 9 is designed to contain roasted coffee beans and to carry out the task of a hopper to provide the beans to be ground, upon request by the electronic operating system of the apparatus, into an underlying coffee grinding and dosing device which, for the purposes of the present invention, shall be deemed to be of fully conventional type.

In a correspondingly conventional manner, a control panel 11, e.g. of electronic type, is placed on the front panel 6, for actuating and adjusting the various functions of the apparatus.

Namely, the panel 11 may comprise a CPU control unit, which is conventional and is not shown herein.

Also particularly referring to FIG. 1, a device 12 for pressing the dose of coffee grounds is shown at the opening 7 of the front panel 6, and is mounted to the end 13 of an arm 14 which extends in cantilever fashion from the front wall 15 of the inner frame of the apparatus 1.

At such opening 7 a vertical conduit 16 is also shown, which is supported by the front wall 15 by stems 17.

Figure 2:
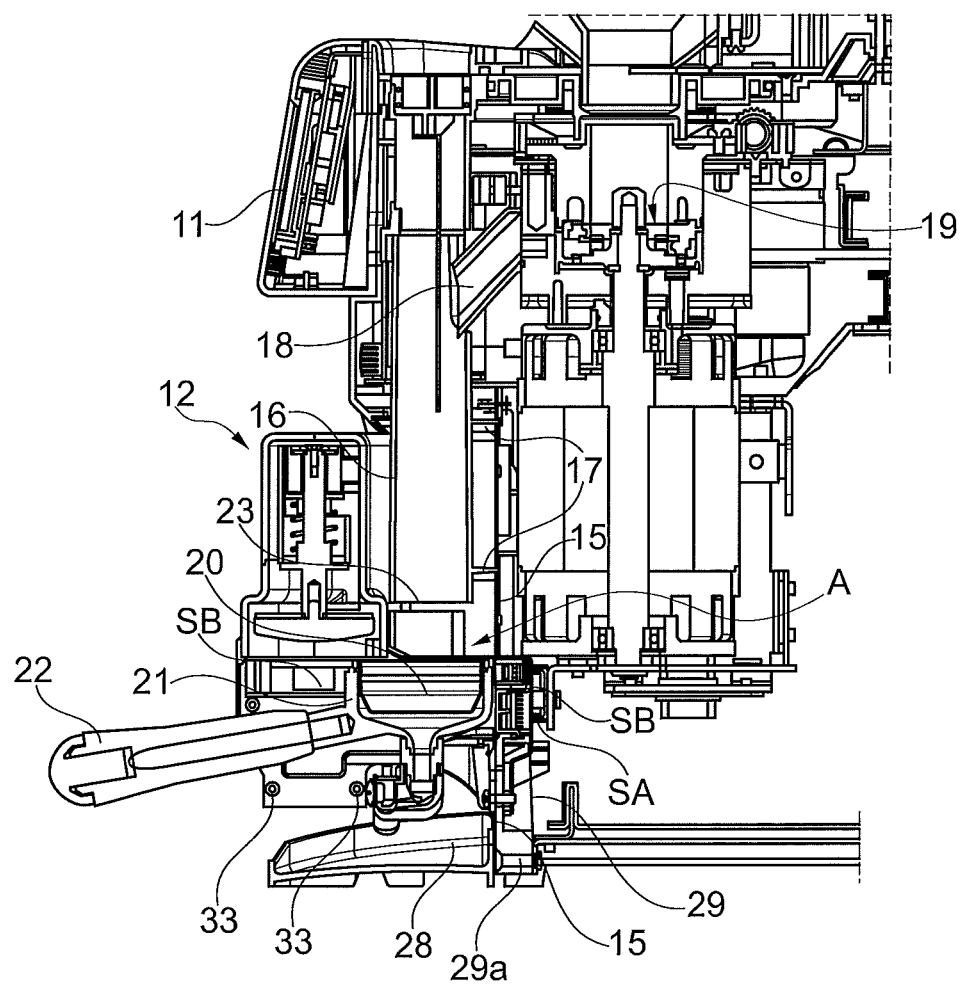
FIG. 2 shows a partial vertically sectional view of the apparatus of FIG. 1 with a portafilter on the support device in the filling station for a dose of coffee grounds.

Also referring to FIG. 2, such conduit 16 is connected to a chute 18 through which a predetermined dose of coffee grounds falls by gravity into the basket 20 of a portafilter 21 from a conventional vibrating grinding-dosing device 19, which is equipped with a conventional operating handle 22 located at the discharge opening 23 of the conduit 16.

Referring now to both FIG. 1 and FIG. 2, at the opening 7, the apparatus of the invention comprises a support, generally referenced 24 in FIG. 1 which, according to a first embodiment, comprises the walls 25 and 26 arranged in side-by-side spaced relationship, with a gap 27 formed therebetween.

A plate 28 is placed at the base of the apparatus for collecting the coffee that may regularly fall into the portafilter 21.

A fork element, attached to a support 29 which is in turn connected to the wall 15 of the frame by a screw 29a, has tines 30 and 31.

Figure 3:
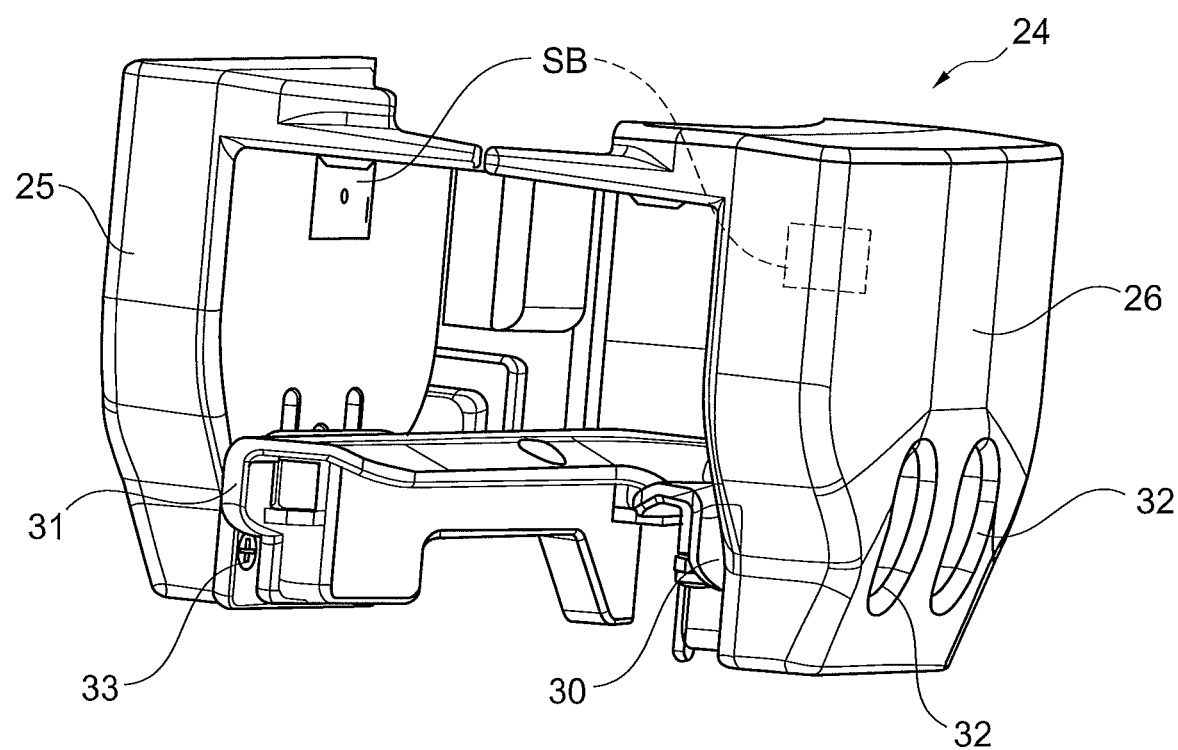
FIG. 3 shows a schematic perspective view of the portafilter supporting device with the first emplacement and the second emplacement configured in aligned relationship on the same horizontal plane.

Said tines 30 and 31 of the fork element, as shown in FIG. 3, support the walls 25 and 26 of the support 24 respectively, in height-adjustable fashion, using slots and fastening screws, such as those referenced 32 and 33 in FIGS. 1, 2 and 3.

Therefore, the support 24 may be adjusted in its vertical position relative to the wall 15 of the frame.

It is also configured with a first emplacement A for the portafilter 21 in which, as shown in FIG. 2, the corresponding basket 20 is located at the discharge opening 23 of the conduit 16 and is ready to receive a predetermined dose of coffee grounds.

The same support 24 is also configured to define a second emplacement B for the portafilter 21, as shown in FIG. 1, so that it will be located at the device 12 for compressing the dose of coffee grounds received in the basket 20 when the portafilter was in the first emplacement A below the conduit 16.

The displacement of the portafilter 21 from first emplacement A, where filling of the dose of coffee grounds takes place, to the second emplacement B where compression of such dose is carried out, is performed manually by the operator, i.e. the barista, by simply having the portafilter 21 slide on the support 24 between the first and the second emplacements, which are configured in aligned relationship to each other on one horizontal plane extending in the direction perpendicular to the wall 15 of the frame.

For easier positioning of the portafilter 21, the emplacements A and B can be preferably identified by mechanical abutments, such as bosses formed on the surface of the support 24 upon which the portafilter 21 is caused to slide, such abutments not being shown in the drawings as they are conventional.

Referring to FIGS. 4, 5, 6 and 7, the pressing device 12, which is mounted to the end 13 of the arm 14, comprises a pestle 34 with a corresponding shaft 35.

The latter vertically extends in a cylindrical enclosure 36 having a slit 37 formed in its wall, with at least one section extending with a helical cam profile 38. A roller 39 is slidingly engaged in said slit 37 with the function of a cam follower, as further discussed below.

The shaft 35 comprises a disk 40, which is rigidly joined thereto and is designed to axially abut the facing end of the enclosure 36, during compression of the dose of coffee grounds in the portafilter, as further explained below.

Figure 6:
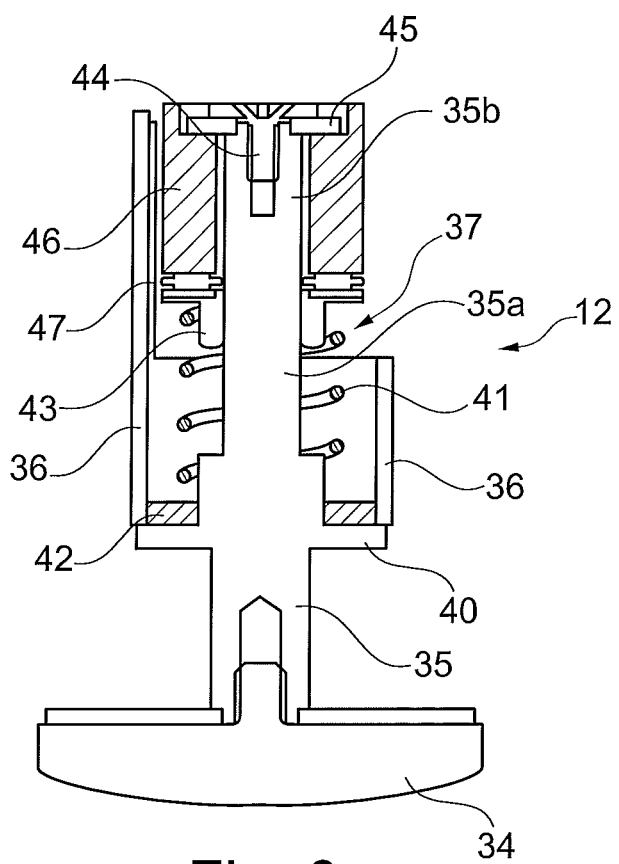
FIG. 6 shows a longitudinal sectional view of the pressing device for pressing the coffee dose.
Figure 7:
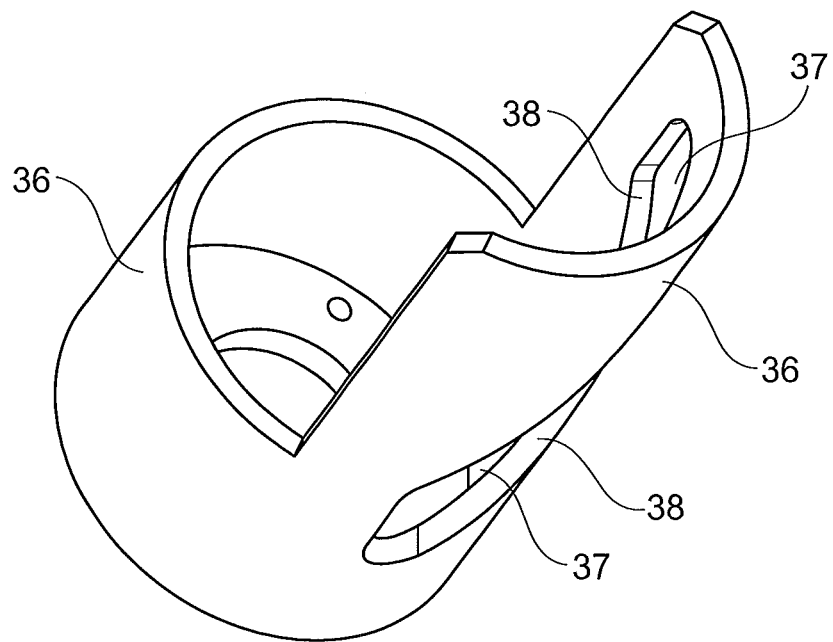
FIG. 7 shows a perspective view of a construction member that is part of the enclosure of the pressing device.

Particularly referring to FIG. 6, the pressing device 12 also comprises a spring 41, which is mounted coaxial with the section 35a of the shaft 35 located within the enclosure 36 and extending between the bottom wall 42 of the cylindrical enclosure 36 and an annular abutment member 43 that is fitted on the section 35a of the shaft 35.

The end portion 35b of the shaft 35 is attached by an axial screw 44, with an interposed washer 45, to the cylindrical body 46 that is part of the end 13 of the arm 14 having the pressing device 12 attached thereto.

The aforementioned cylindrical body 46 has the roller 39 that acts as a cam follower in the helical slit 37 of the cylindrical enclosure mounted thereto, transverse to its vertical axis.

As shown in FIG. 6, front bearings 47 are placed between the annular abutment member 43 and the cylindrical body 46, allowing the shaft 35 and its pestle 34 to perform an angular movement about their longitudinal axis.

Such angular movement occurs as a result of the axial displacement imparted to the pestle 34 during pressing, when it contacts the surface the dose of coffee grounds with which the basket 20 of the portafilter 21 has been filled, as a result of the engagement of the roller 39 with the helical profile 38 of the window 37 on the cylindrical enclosure 36.

Figure 4:
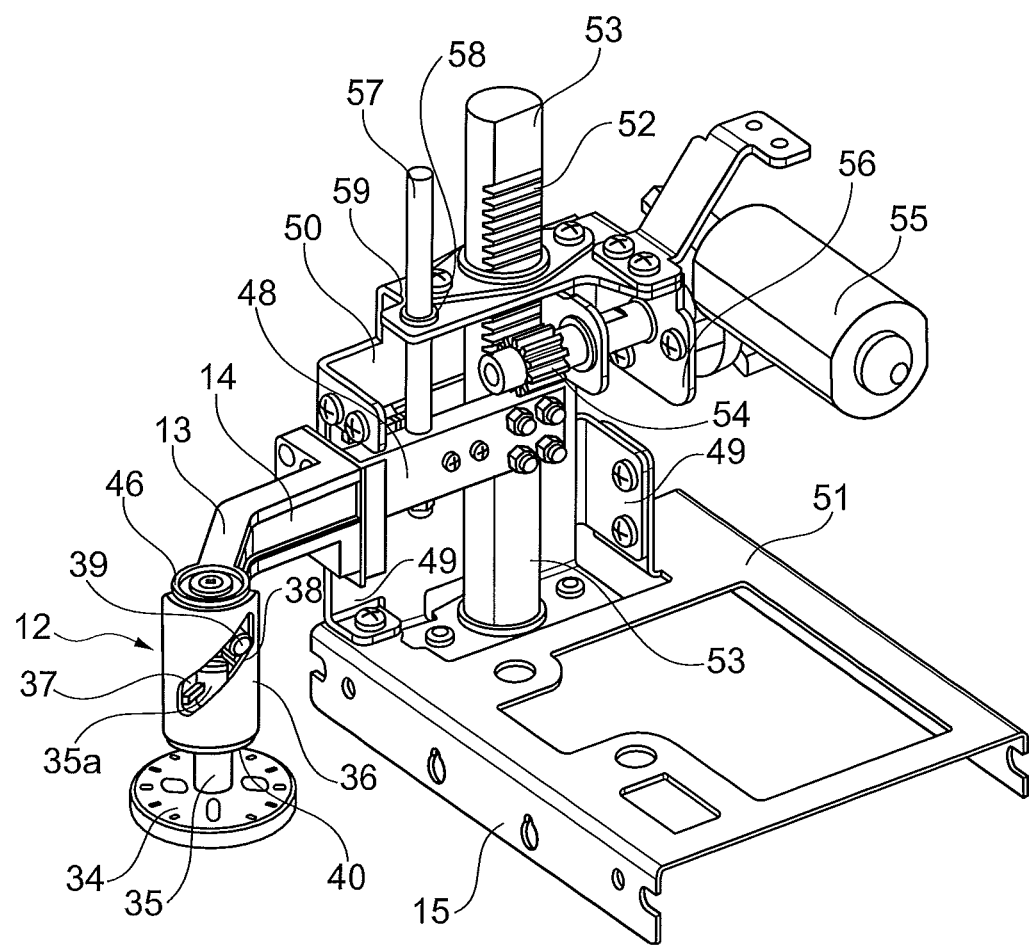
FIG. 4 shows a schematic perspective view of the pressing device for pressing the dose of coffee grounds and the associated motor means for moving the device toward and away from the dose of coffee grounds.
Figure 5:
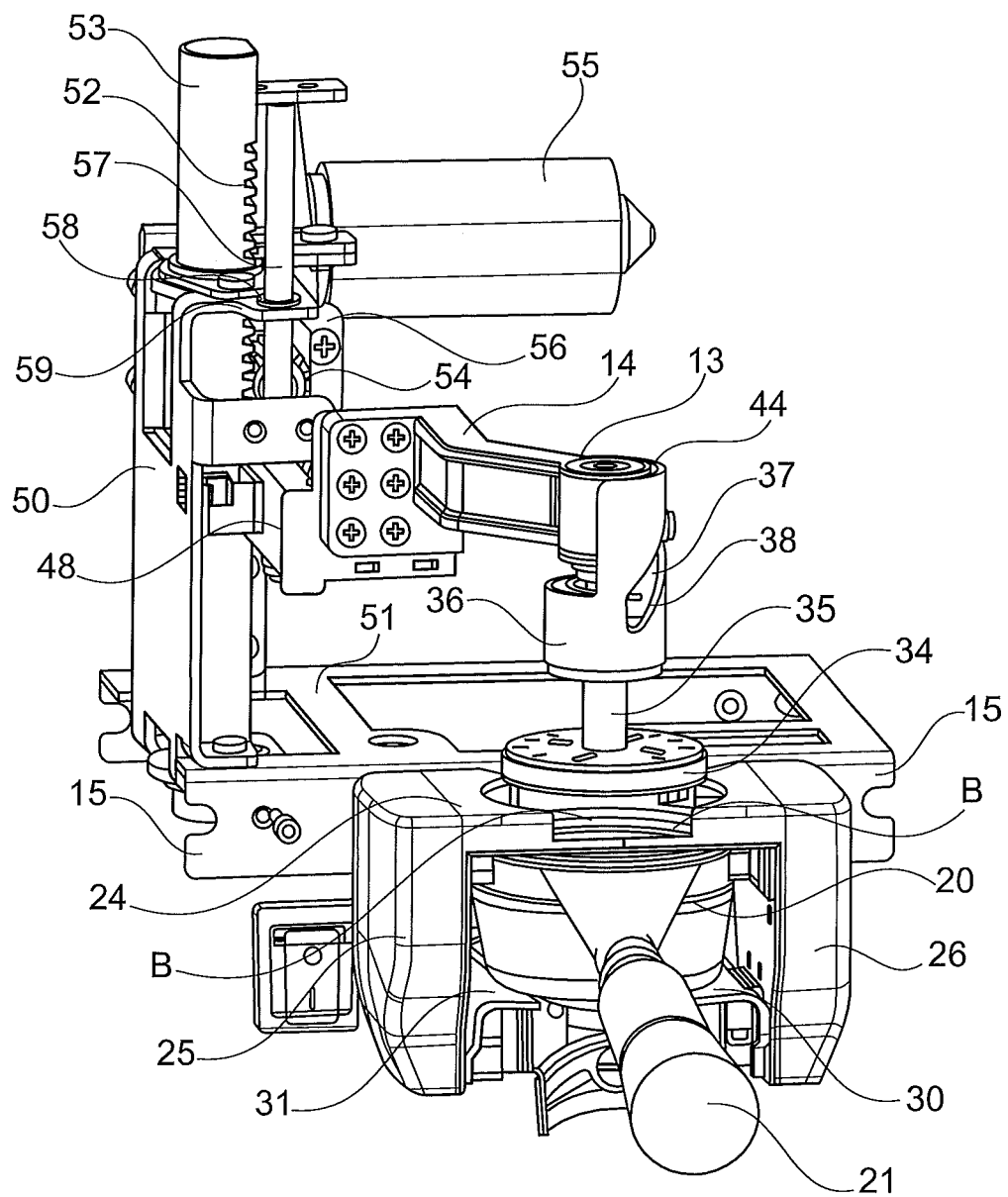
FIG. 5 shows a schematic perspective front view of the pressing device of FIG. 4 located in vertical aligned relationship below said second emplacement of the portafilter.

Particularly referring to FIGS. 4 and 5 it shall be noted that the arm 14 having the pressing device 12 connected at its end 13 is carried by a horizontal bar 48, which is mounted to a support frame 49, 50 that can be displaced vertically relative to a base 51 that is part of the inner frame of the apparatus.

The movement of the bar 48 that causes the pressing device 12 to move toward and away from the dose of coffee grounds in the basket 20 of the portafilter, thereby allowing pressing to occur, is obtained by means of a rack 52 carried by a vertical column 53 placed on the base 51, and a pinion 54 that engages with the rack 52, and is driven by an electric motor 55, the latter being mounted to a frame 56 rigidly coupled to the frame 50.

A rod 57 that is rigidly joined to the bar 48 and able to slide within a hole 58 formed in the plate 59 rigidly coupled to the frame 50, helps to maintain a horizontal orientation of the bar 48 as it moves vertically.

Figure 8:
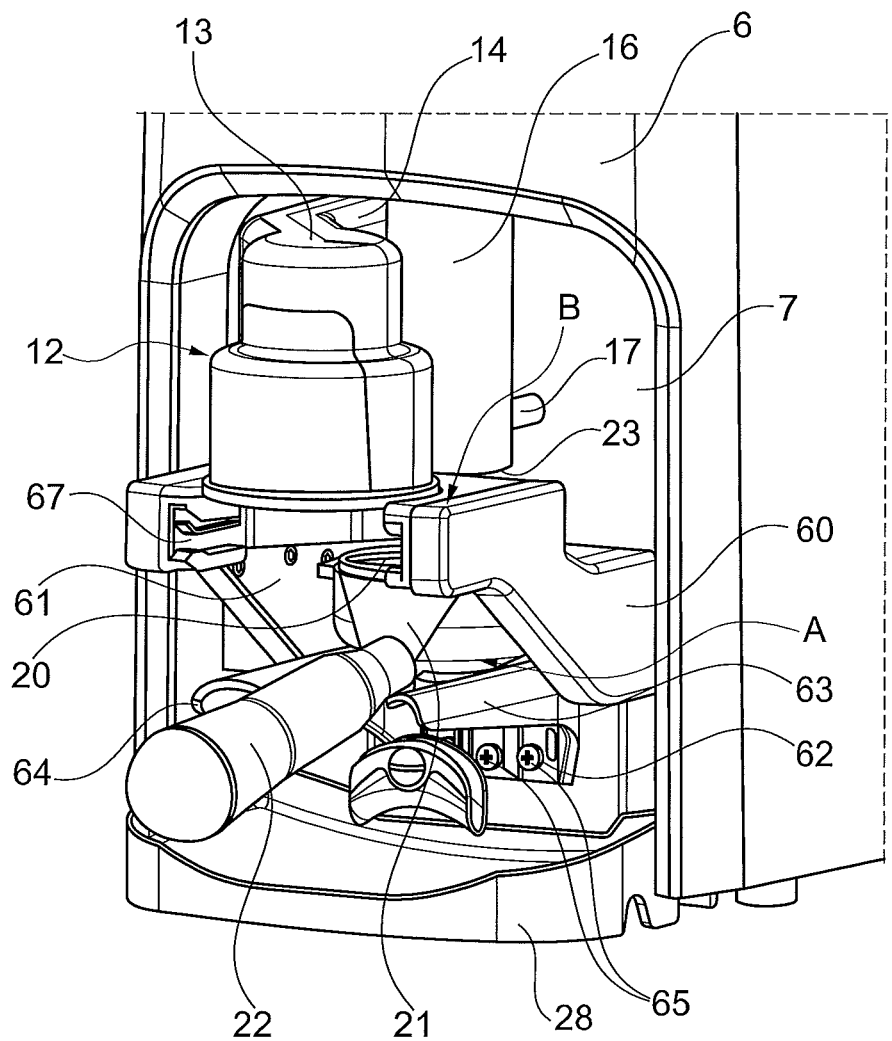
FIG. 8 shows a partial front view of the apparatus of the invention with the portafilter supporting device formed according to a second embodiment and with a portafilter located in the filling station for a dose of coffee grounds.
Figure 9:
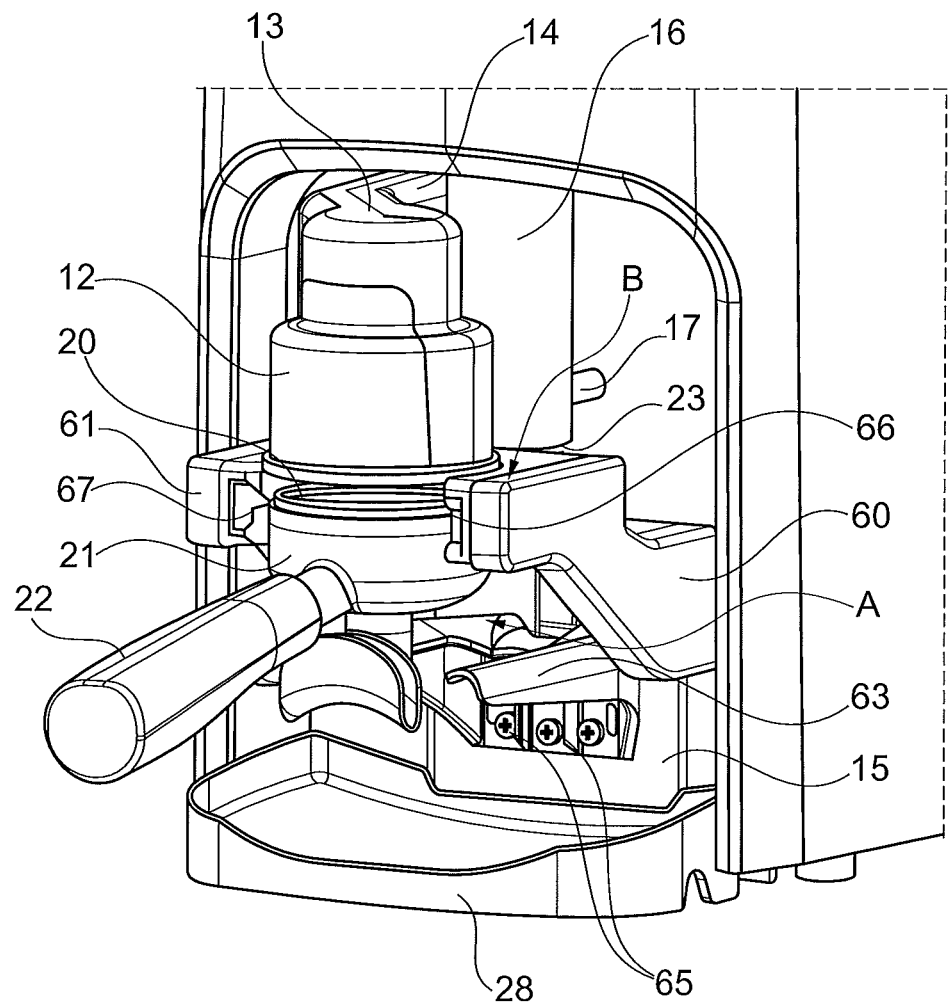
FIG. 9 shows a partial perspective view of the apparatus of the invention with the portafilter supporting device formed according to the second embodiment and with a portafilter located in the compression station for the dose of coffee grounds.
Figure 10:
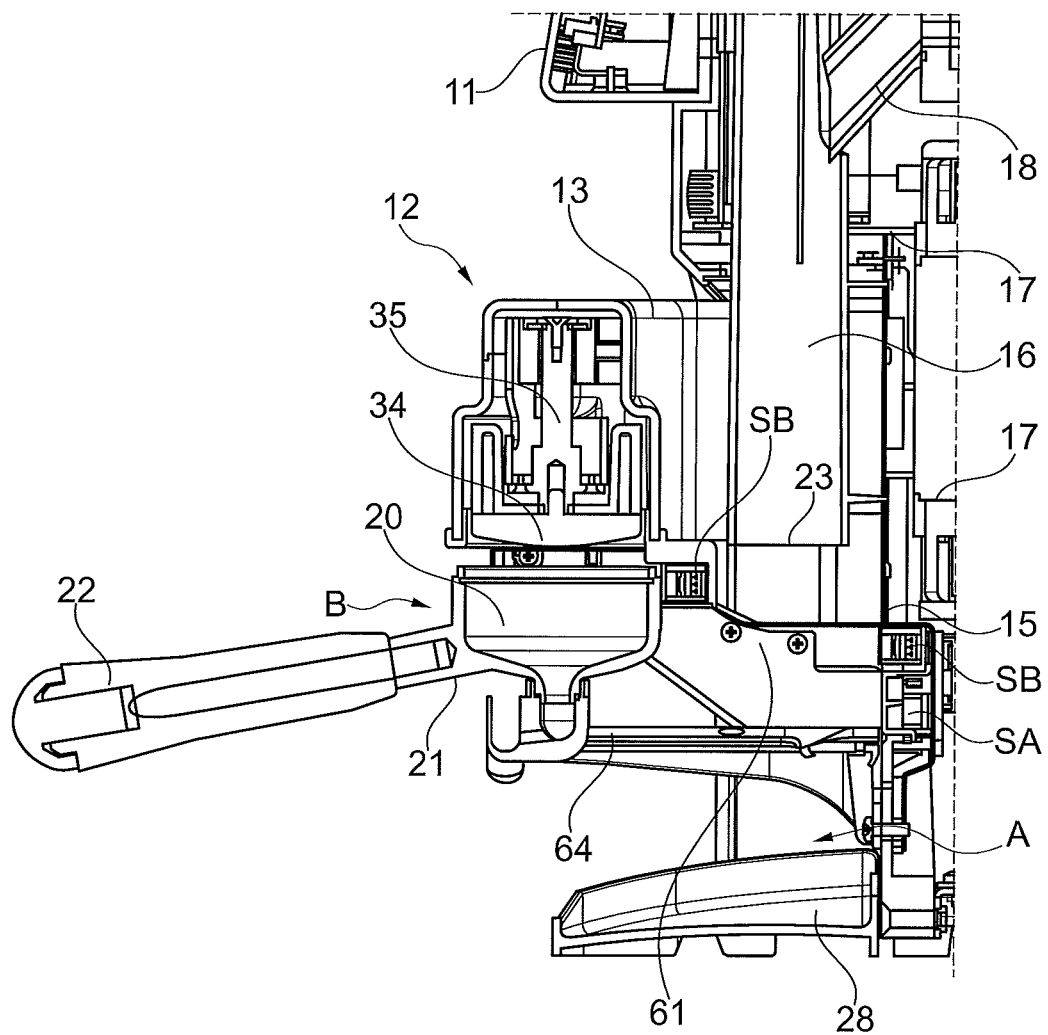
FIG. 10 is a vertically sectional schematic view of the apparatus of FIG. 9.

Referring to FIGS. 8, 9 and 10, a second embodiment of the support 24 will be now described, in which said first and second emplacements A and B for positioning the portafilter 21 are configured on respective horizontal planes which are in superimposed and vertically spaced relationship to each other.

According to this embodiment, the support 24 comprises the side walls 60 and 61, attached in cantilevered fashion to the wall 15 of the inner frame of the apparatus, and a fork element 62 with tines 63 and 64.

The fork element 62 is also attached in cantilevered fashion to the wall 15 of the inner frame of the apparatus by means of screws 65 for vertical position adjustment, such that the right position under the opening 23 of the conduit 16 can be found for proper positioning of the portafilter 21.

Therefore, the tines 63 and 64 define the emplacement A for filling the basket 20 of the portafilter 21 with the dose of coffee grounds, the portafilter being placed for this purpose on the tines 63 and 64 as shown in FIG. 8.

The second emplacement, namely the emplacement B where the dose of coffee grounds is pressed, according to the second embodiment of the support 24, is configured by the guides 66 and 67 formed on the facing inner sides of the walls 60 and 61 at the top sides of such walls 60 and 61.

The portafilter 21 is manually positioned in 66 and 67 and the dose of coffee grounds is later pressed by moving the pressing device 12 toward and away from it.

Therefore, according to the above discussed embodiment, said second emplacement B is configured on a horizontal plane other than that designed for the emplacement A for filling the basket 20 of the portafilter 21, which is vertically displaced relative to it.

In both embodiments of the support 24, the emplacements A and B that have been configured thereon are intended to be equipped with sensors SA and SB that detect both the presence of the portafilter in the given position, and its proper orientation in space.

Preferably but without limitation these sensors are placed on the vertical wall 15 of the inner frame of the apparatus 1.

In addition, these sensors may incorporate the functionality of reading certain codes on the portafilter, allowing them to derive the commands to be given to the members for dispensing the doses of coffee grounds and of determining the pressing operation in the emplacement B and stopping it, as soon as the target compression value has been reached, e.g. by reading and decoding an energy absorption signal by the members for moving the compression device 12 relative to the dose of coffee grounds.

The operation of the apparatus, in both the first and second embodiments of the portafilter support, is self-evident from the above description thereof.

In both embodiments, once the portafilter 21 has been placed in the first emplacement A, the sensor of this emplacement, as mentioned above, indicates the presence of the portafilter and instructs to fill the predetermined target dose of coffee grounds by acting upon the designated actuator means via a conventional CPU.

Once dose filling has been terminated, the portafilter is moved by the operator, i.e the barista, from the emplacement A to the emplacement B, where the corresponding sensor detects its presence and determines that the device 12 has moved against the dose of coffee grounds in the basket 20 of the portafilter 21.

As the pestle 34 contacts the free surface of the dose of coffee grounds and is still lowered due to the rotation of the pinion 54 on the rack 52, the coffee powder is axially compressed and the pestle is rotated about the axis of its shaft 35 as the cam connection between the roller 39 carried by the cylindrical body 46 and the helical profile 38 in the enclosure 36, also causes an angular displacement of the pestle preferably, but without limitation, through 45°.

The compression of the dose of coffee grounds ends when the CPU of the apparatus detects a given current absorption by the motor members for actuating the pressing device 12, such absorption corresponding to the achievement of a given force, e.g. 20 Kgf, applied by the pressing device 12 to the surface of the dose of coffee within the filter holder.

Obviously, the CPU of the apparatus can store various current absorption values corresponding to as many pressing values achieved in the dose of coffee depending on the type of coffee that has been used, on the favorite recipe by the operator, i.e the barista, or on the type of portafilter.

As the compression operation has been terminated, the portafilter is ready to be attached to the dispenser unit of an espresso machine, which is designed to deliver the beverage.

Therefore, the apparatus of the invention fulfills both purposes of filling the basket of the portafilter with a predetermined dose of coffee grounds whose quantitative value can be effectively consistent and of carrying out a predetermined pressing operation, in a single apparatus.

The invention is susceptible of variant embodiments, which may be other than those expressly mentioned in the foregoing description, without departure from the scope of the following claims.

The invention claimed is:

1. An apparatus for filling a basket of a portafilter of an espresso machine with a predetermined dose of coffee grounds and for pressing the dose of coffee grounds within the portafilter, the apparatus comprising:
   a frame having a front wall;
   a support projecting from said front wall that is structured and arranged to support the portafilter in a first position for dispensing the dose of coffee grounds into the basket of the portafilter, and to support the portafilter in a second position for pressing the dose of coffee, wherein the second position is horizontally offset from the first position in a direction perpendicular to the front wall;
   a conduit comprising an opening configured to be located above the basket of the portafilter when the portafilter is in the first position;
   a dispenser structured and arranged to dispense the dose of coffee grounds through said conduit into the basket of the portafilter;
   a pressing device structured and arranged to press the dose of coffee grounds when the portafilter is in the second position;
   a cantilever arm extending from said frame and supporting the pressing device in a vertically aligned position above said second position; and
   a motor structured and arranged to move the pressing device toward and, away from the dose of coffee grounds contained in the basket of the portafilter.

2. The apparatus as claimed in claim 1, wherein said first and second positions of the portafilter on the support are aligned on a common horizontal plane.

3. The apparatus as claimed in claim 1, wherein said front wall of said flame comprises at least one sensor structured and arranged to detect the portafilter when the portafilter is in said first position.

4. The apparatus as claimed in claim 3, wherein said front wall of said frame further comprises a sensor structured and arranged to detect the portafilter when the portafilter is in said second position.

5. The apparatus as claimed in claim 4, wherein said frame comprises a monitoring and control panel connected to said sensors, to the dispenser device for dispensing the coffee grounds, and to the motor structured and arranged to drive said pressing device.

6. The apparatus as claimed in claim 1, wherein said support for supporting the portafilter comprises means for adjusting a position of the support in relation to said front wall of the frame.

7. The apparatus as claimed in claim 1, wherein said cantilever arm supporting said pressing device extends from said front wall of the frame and is vertically movable by a rack and pinion device.

8. The apparatus as claimed in claim 1, wherein said pressing device comprises a pestle connected to a shaft slidingly mounted within a housing and supported by the cantilever arm, said shaft engaged with a cam mechanism comprising at least one helical portion structured and arranged to impart an angular displacement to the pestle when said pressing device is moved toward and away from a surface of the dose of coffee grounds.

9. The apparatus as claimed in claim 8, wherein said angular displacement of the pestle is a 45° displacement.

10. The apparatus as claimed in claim 1, further comprising means for stopping the pressing of the dose of coffee grounds when an electric current absorption value is reached by the motor.

11. The apparatus as claimed in claim 10, wherein the means for stopping the pressing of the dose of coffee grounds comprises a central processing unit having a plurality of electric current absorption threshold values stored therein, and each value of said plurality of values corresponds to a respective pressing tierce value within a range of from 15 Kgf to 25 Kgf that is applied to the dose of coffee grounds in the portafilter.

* * * * *